US008731089B2

(12) United States Patent
Ohwatari et al.

(10) Patent No.: US 8,731,089 B2
(45) Date of Patent: May 20, 2014

(54) RADIO COMMUNICATION SYSTEM, RADIO BASE STATION APPARATUS AND COMMUNICATION CONTROL METHOD

(75) Inventors: Yusuke Ohwatari, Kanagawa (JP); Anass Benjebbour, Kanagawa (JP); Yukihiko Okumura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 270 days.

(21) Appl. No.: 13/020,282

(22) Filed: Feb. 3, 2011

(65) Prior Publication Data

US 2011/0188540 A1 Aug. 4, 2011

(30) Foreign Application Priority Data

Feb. 4, 2010 (JP) ................................ 2010-023094

(51) Int. Cl.

| | |
|---|---|
| ***H04B 1/00*** | (2006.01) |
| ***H04B 15/00*** | (2006.01) |
| ***H04B 7/02*** | (2006.01) |

(52) U.S. Cl.

USPC ...... 375/267; 375/130; 375/285; 375/E1.001; 370/203; 370/431; 455/501; 455/512

(58) Field of Classification Search

CPC . H04L 25/0224; H04L 25/0226; H04L 27/26; H04L 27/0224; H04L 1/00; H04L 5/00; H04L 5/0048; H04L 5/0058; H04L 5/0073

USPC ........... 375/130, 285, 267, E1.001; 370/203, 370/431; 455/501, 512

See application file for complete search history.

(56) References Cited

U.S. PATENT DOCUMENTS

| | | | | |
|---|---|---|---|---|
| 6,452,917 | B1 * | 9/2002 | Leung | 370/342 |
| 6,539,228 | B1 * | 3/2003 | Tateson | 455/446 |
| 8,121,090 | B1 * | 2/2012 | Dinan et al. | 370/331 |
| 8,213,943 | B2 * | 7/2012 | Malladi et al. | 455/450 |
| 8,265,629 | B2 * | 9/2012 | Kwon et al. | 455/436 |
| 2005/0048974 | A1 * | 3/2005 | Kim et al. | 455/436 |
| 2007/0211757 | A1 * | 9/2007 | Oyman | 370/468 |

(Continued)

FOREIGN PATENT DOCUMENTS

| | | |
|---|---|---|
| JP | 2002-141858 | 5/2002 |
| JP | 2009-273180 | 11/2009 |
| WO | 2008/126302 A1 | 10/2008 |

OTHER PUBLICATIONS

Office Action with English Translation, Dated—Feb. 7, 2012, issued in conjunction with Japanese Patent Application No. 2010-023094.

(Continued)

*Primary Examiner* — Daniel Washburn
*Assistant Examiner* — Amneet Singh
(74) *Attorney, Agent, or Firm* — MKG, LLC

(57) ABSTRACT

The present invention provides a radio communication system which includes a plurality of radio base station apparatuses that transmit reference signals orthogonal to each other among a plurality of transmitting antennas and a mobile terminal apparatus that performs channel estimation based on the reference signals transmitted from the plurality of radio base station apparatuses, sets priority among a plurality of neighboring radio base station apparatuses and introduces a bias in the number of reference signals that can be allocated to each radio base station apparatus according to the priority from the radio resources shared among the plurality of neighboring radio base station apparatuses.

10 Claims, 12 Drawing Sheets

(56) References Cited

U.S. PATENT DOCUMENTS

| | | | | |
|---|---|---|---|---|
| 2007/0253465 | A1* | 11/2007 | Muharemovic et al. | 375/130 |
| 2009/0011767 | A1* | 1/2009 | Malladi et al. | 455/450 |
| 2009/0029713 | A1* | 1/2009 | Dharia et al. | 455/450 |
| 2010/0015987 | A1* | 1/2010 | Katori et al. | 455/450 |
| 2010/0056171 | A1* | 3/2010 | Ramprashad et al. | 455/452.1 |
| 2010/0062783 | A1* | 3/2010 | Luo et al. | 455/450 |
| 2010/0080269 | A1* | 4/2010 | Kim et al. | 375/211 |
| 2010/0135360 | A1* | 6/2010 | Kwak et al. | 375/135 |
| 2010/0189038 | A1* | 7/2010 | Chen et al. | 370/328 |
| 2010/0195527 | A1* | 8/2010 | Gorokhov et al. | 370/252 |
| 2010/0195599 | A1* | 8/2010 | Zhang et al. | 370/329 |
| 2011/0038344 | A1* | 2/2011 | Chmiel et al. | 370/330 |
| 2011/0090820 | A1* | 4/2011 | Hussein et al. | 370/255 |
| 2011/0170516 | A1* | 7/2011 | Hu et al. | 370/331 |
| 2011/0200029 | A1* | 8/2011 | Farmandar et al. | 370/338 |
| 2011/0255436 | A1* | 10/2011 | Jian et al. | 370/252 |
| 2012/0021738 | A1* | 1/2012 | Koo et al. | 455/422.1 |
| 2012/0028665 | A1* | 2/2012 | Kwon et al. | 455/501 |
| 2012/0087265 | A1* | 4/2012 | Tamaki et al. | 370/252 |
| 2012/0309291 | A1* | 12/2012 | Sawai | 455/7 |

OTHER PUBLICATIONS

"3GPP TR 25.913 V8.0.0 (Dec. 2008): Technical Report: 3rd Generation Partnership Project; Technical Specification Group Radio Access Network; Requirements for Evolved UTRA (E-UTRA) and Evolved UTRAN (E-UTRAN) (Release 8)" Dec. 2008.

* cited by examiner

RADIO COMMUNICATION SYSTEM, RADIO BASE STATION APPARATUS AND COMMUNICATION CONTROL METHOD

CROSS REFERENCE TO RELATED APPLICATION

This application is based upon and claims the benefit of priority from the prior Japanese Patent Application No. 2010-023094, filed on Feb. 4, 2010; the entire contents of which are incorporated herein by reference.

FIELD OF THE INVENTION

The present invention relates to a radio communication system, a radio base station apparatus and a communication control method for transmitting reference signals (RS) for channel estimation.

BACKGROUND

The standardization organization 3GPP is studying Long Term Evolution (LTE), which is a communication scheme as a successor to a wideband code division multiple access (WCDMA) scheme, high-speed downlink packet access (HS-DPA) scheme, high-speed uplink packet access (HSDPA) scheme or the like (Release-8, 9). Release-8, 9 LTE (hereinafter referred to as “REL8, 9-LTE”) defines an orthogonal frequency division multiplexing access (OFDMA) scheme as a radio access scheme for improving frequency utilization efficiency on a downlink.

Furthermore, REL8, 9-LTE defines a radio transmission method (MIMO: Multiple-Input Multiple-Output) for improving communication quality by providing a transmitter and a receiver with a plurality of antennas respectively (e.g., 3GPP TR 25.913[1]). MIMO transmission improves a transmission rate by transmitting different pieces of information from respective transmitting antennas at the same frequency and at the same timing. Furthermore, REL8, 9-LTE defines a reference signal configuration for channel estimation corresponding to a radio base station apparatus having a maximum of four transmitting antennas.

However, for LTE, a simultaneous channel estimation method for a plurality of radio base station apparatuses remains as a problem yet to be solved. A conventional reference signal configuration does not support MIMO transmission covering a plurality of radio base station apparatuses, and therefore reference signal are not orthogonalized to each other among the radio base station apparatuses. For this reason, when channel estimation is performed among the plurality of radio base station apparatuses simultaneously, there is a problem that the estimation accuracy deteriorates due to interference.

SUMMARY OF THE INVENTION

The present invention has been implemented in view of such problems and it is an object of the present invention to provide a radio communication system, a radio base station apparatus and a communication control method that can realize simultaneous channel estimation while maintaining predetermined estimation accuracy and increase the number of radio base station apparatuses capable of realizing simultaneous channel estimation while suppressing an increase in the number of radio resources allocated for reference signals.

A radio communication system of the present invention includes a plurality of radio base station apparatuses that have a plurality of transmitting antennas and transmit reference signals which are orthogonal to each other among the plurality of transmitting antennas and a mobile terminal apparatus that performs channel estimation based on the reference signals transmitted from the plurality of radio base station apparatuses, the plurality of radio base station apparatuses including a reference signal generation section that generates the reference signals, a priority setting section that sets priority with respect to other neighboring radio base station apparatus, an allocation number determining section that determines the number of radio resources allocated of the reference signals allocated according to the priority from radio resources used in common with the other radio base station apparatus and an allocation section that allocates the reference signals corresponding in number to the radio resources allocated so as to be orthogonal to those of the other radio base station apparatus.

DETAILED DESCRIPTION

Hereinafter, embodiments of the present invention will be described in detail with reference to the accompanying drawings. FIG. 1 is a diagram illustrating an overview of a radio communication system according to an embodiment of the present invention. The radio communication system shown in FIG. 1 is an example and not limited to this configuration. Any configuration may be adopted for the radio communication system as long as it provides priority among neighboring radio base station apparatuses and introduces a bias in the number of reference signals allocated within radio resources used in common among the radio base station apparatuses.

Figure 1A:
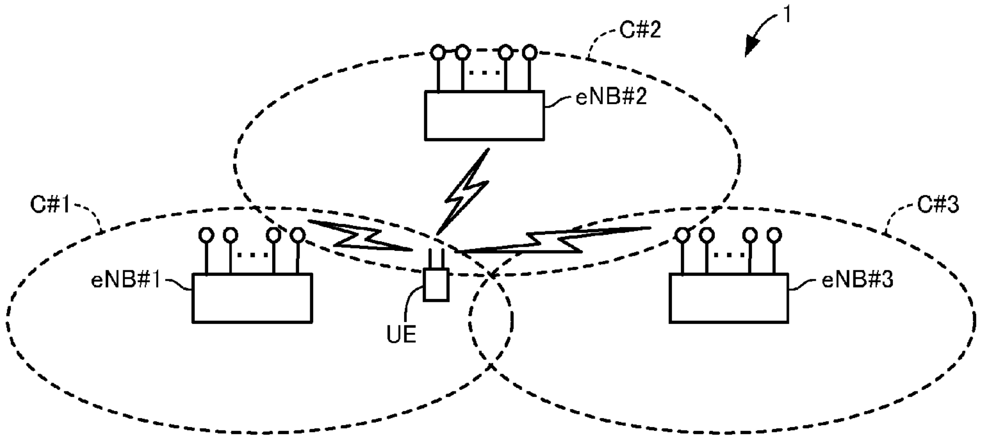
FIG. 1A is a diagram illustrating an overview of a radio communication system.

A radio communication system 1 shown in FIG. 1A is provided with a radio base station apparatus eNB#1 that covers a cell C#1, a radio base station apparatus eNB#2 that covers a cell C#2 and a radio base station apparatus eNB#3 that covers a cell C#3. The three radio base station apparatuses eNB#1 to #3 are neighboring each other and are configured to be able to communicate with a mobile terminal apparatus UE in the cell C using a plurality of transmitting antennas. The mobile terminal apparatus UE has a plurality of receiving antennas, receives a reference signal transmitted from each transmitting antenna of the radio base station apparatus eNB and performs channel estimation based on the reference signals. The mobile terminal apparatus UE carries out data communication with the radio base station apparatus eNB using the channel estimation result.

Figure 1B:
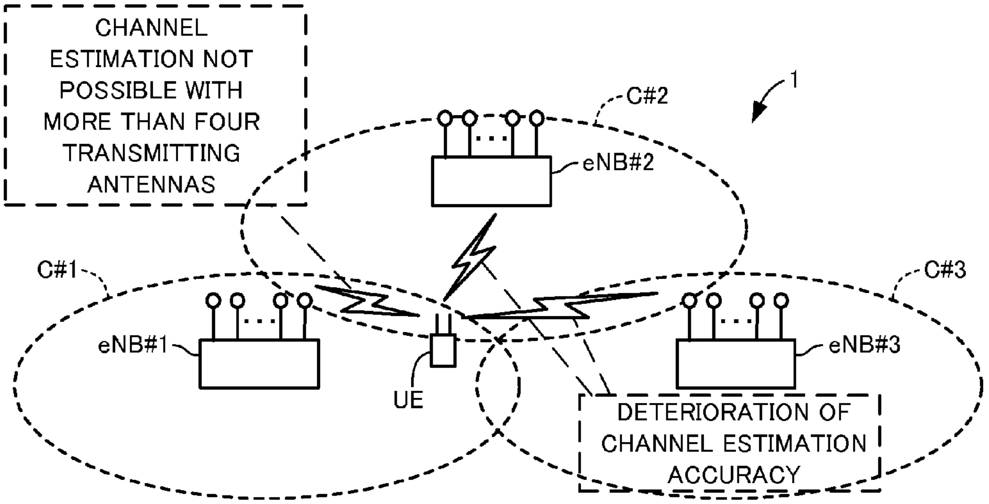
FIG. 1B is a diagram illustrating an overview of a radio communication system.

REL8, 9-LTE shown in FIG. 1B defines a reference signal configuration for channel estimation corresponding to a radio base station apparatus with a maximum of four transmitting antennas. However, as the downlink communication capacity increases, the number of transmitting antennas is expected to increase, whereas the conventional reference signal configuration does not support a radio base station apparatus with eight transmitting antennas and cannot perform channel estimation corresponding to eight transmitting antennas. To solve this problem, a study on a reference signal configuration corresponding to a radio base station apparatus with a maximum of eight transmitting antennas is underway, but establishment of a simultaneous channel estimation method among a plurality of radio base station apparatuses aiming at the realization of CoMP (Coordinated Multiple Point transmission) remains as a problem yet to be solved.

For example, assuming a case where the radio base station apparatuses eNB#1 to #3 each have four transmitting antennas and the number of reference signals per transmitting antenna is 2, 24 resource elements (radio resources allocated) are necessary per resource block so as to orthogonalize reference signals among all transmitting antennas of all the radio base station apparatuses eNB#1 to #3. In this case, when the number of reference signals per resource block is defined to be a maximum of 16 resource elements as radio resources used in common among the radio base station apparatuses eNB#1 to #3, it is impossible to orthogonalize reference signals among all the transmitting antennas of all the radio base station apparatuses eNB#1 to #3.

Therefore, when simultaneous channel estimation is performed among the three radio base station apparatuses eNB#1 to #3, the estimation accuracy deteriorates due to interference. For this reason, unless the number of resource elements for reference signal allocation of radio resources increases, it is not possible to increase the number of radio base station apparatuses eNB for which simultaneous channel estimation is possible Thus, the present invention provides priority among the radio base station apparatuses eNB#1 to #3 to thereby set more resource elements to which reference signals within radio resources can be allocated in a radio base station apparatus eNB with high priority than the other radio base station apparatuses eNB. Thus, the present invention introduces a bias in the number of reference signals allocated, thereby causing the number of reference signals allocated to fall within a limited range of radio resources (e.g., 16 resource elements) and orthogonalizes the reference signals at all the transmitting antennas among all the neighboring radio base station apparatuses eNB#1 to #3.

Figure 2:
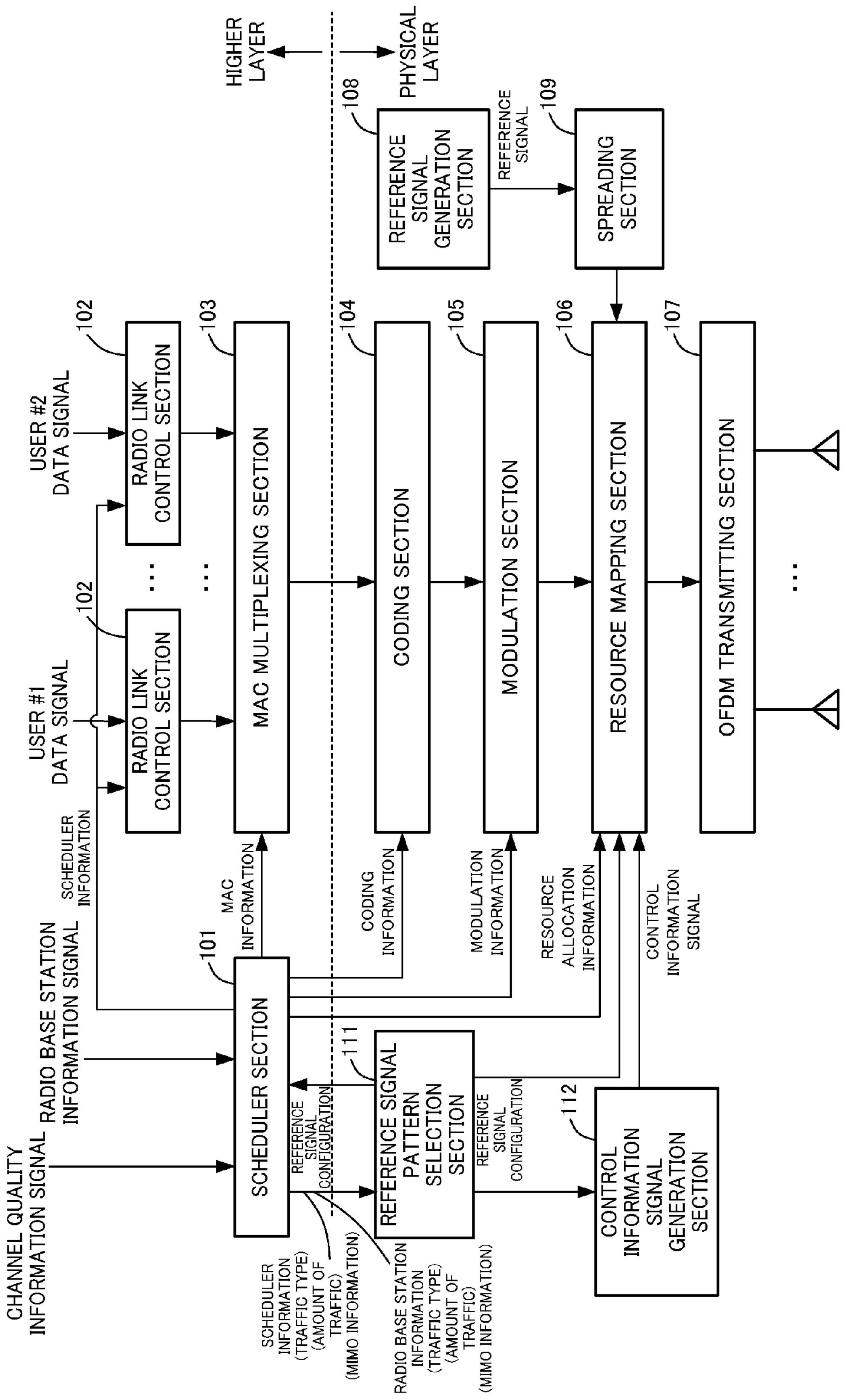
FIG. 2 is a functional block diagram of a radio base station apparatus.

Hereinafter, functional configurations of the radio base station apparatus and mobile terminal apparatus will be described with reference to FIG. 2 and FIG. 3. First, the functional configuration of the radio base station apparatus will be described with reference to FIG. 2. FIG. 2 is a functional block diagram of the radio base station apparatus according to an embodiment of the present invention.

As shown in FIG. 2, the radio base station apparatus eNB includes a scheduler section 101, a user-specific radio link control section 102 and a MAC multiplexing section 103 as a higher layer and includes a coding section 104, a modulation section 105, a resource mapping section 106, an OFDM transmitting section 107, a reference signal generation section 108, a spreading section 109, a reference signal pattern selection section 111 and a control information signal generation section 112 as a physical layer. The scheduler section 101 schedules each user based on a channel quality information signal per user fed back from a mobile terminal apparatus UE. The radio link control section 102 sets an optimum amount of data allocated to the physical layer based on the scheduler information reported from the scheduler section 101 in a data signal per user transferred from a higher apparatus or the like.

The MAC multiplexing section 103 MAC-multiplexes data signals from the user-specific radio link control section 102 based on MAC information reported from the scheduler section 101. The coding section 104 codes the MAC-multiplexed data signal based on coding information reported from the scheduler section 101. The modulation section 105 modulates the coded data signal based on modulation information reported from the scheduler section 101.

The reference signal generation section 108 generates a reference signal sequence for channel estimation. When multiplexing reference signals according to a CDM (Code Division Multiple) scheme, the spreading section 109 code-spreads and multiplexes the reference signal sequence. The reference signal pattern selection section 111 selects a reference signal configuration and reports the reference signal configuration to the scheduler section 101 and the resource mapping section 106. In this case, the reference signal pattern selection section 111 maintains priority information with respect to the other neighboring radio base station apparatuses eNB and selects a reference signal configuration based on the priority information.

The priority information is configured to periodically change with respect to the other neighboring radio base station apparatuses eNB. That is, priority levels among the radio base station apparatuses eNB are switched among the three radio base station apparatuses eNB with the passage of time. Furthermore, the reference signal configuration selected by the reference signal pattern selection section 111 indicates the number of reference signals and an allocation pattern of the radio base station apparatus eNB in one resource block. The reference signal configuration reported to the scheduler section 101 is used to generate resource allocation information indicating allocated radio resources of a data signal.

The above described configuration assumes a configuration in which priority levels are periodically changed among neighboring radio base station apparatuses eNB, but the present invention is not limited to this configuration. A configuration may also be adopted such that priority levels are changed among the neighboring radio base station apparatuses eNB according to the traffic type or amount of traffic. In this case, the reference signal pattern selection section 111 acquires radio base station information from the other radio base station apparatuses eNB via the scheduler section 101 and acquires the traffic type or amount of traffic of the other neighboring radio base station apparatuses eNB from the radio base station information. Furthermore, the reference signal pattern selection section 111 acquires scheduler information from the scheduler section 101 and acquires the traffic type or amount of traffic of the own apparatus. Priority is set for the traffic type in descending order of communication quality required, and priority is set for the amount of traffic in descending order of amount of traffic.

A configuration may also be adopted such that priority levels are changed among neighboring radio base station apparatuses eNB according to the type of MIMO processing (pre-coding processing). In this case, the reference signal pattern selection section 111 acquires radio base station information from the other radio base station apparatuses eNB via the scheduler section 101 and acquires MIMO information of the other radio base station apparatuses eNB from the radio base station information. Furthermore, the reference signal pattern selection section 111 acquires MIMO information of the own apparatus from the scheduler section 101. The MIMO information indicates the type of MIMO processing and priority is set in descending order of, for example, Intra-cell CoMP, MU-MIMO, Closed-Loop SU-MIMO and Open-Loop SU-MIMO.

The control information signal generation section 112 generates a control information signal and adds the reference signal configuration selected by the reference signal pattern selection section 111 to the control information signal. The control information signal corresponds to a DCI format, is transmitted to the mobile terminal apparatus UE and used for downlink control.

The resource mapping section 106 maps the modulated data signal to each layer according to a MIMO spatial multiplexing number (number of layers) based on the resource allocation information reported from the scheduler section 101, applies pre-coding processing thereto and then maps the data signal to resource elements of radio resources. Furthermore, the resource mapping section 106 maps reference signals to the resource elements of the radio resources based on the reference signal configuration reported from the reference signal pattern selection section 111. Furthermore, the resource mapping section 106 maps the control information signal including the reference signal configuration to the predetermined resource elements for the control channel. The OFDM transmitting section 107 performs OFDM transmission processing on the mapped transmission data.

Next, the functional configuration of the mobile terminal apparatus will be described with reference to FIG. 3. FIG. 3 is a functional block diagram of a mobile terminal apparatus according to the embodiment of the present invention.

Figure 3:
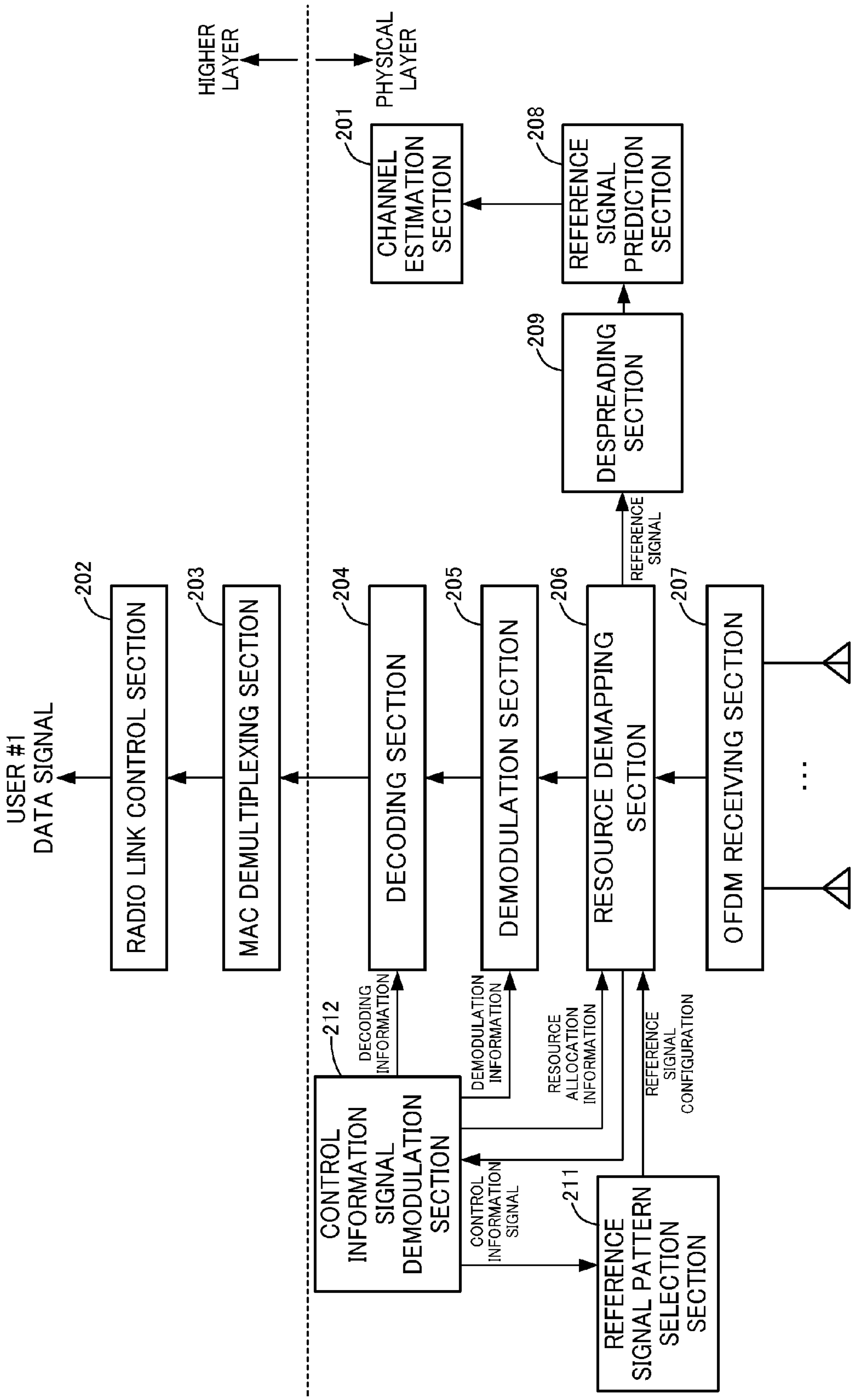
FIG. 3 is a functional block diagram of a mobile terminal apparatus.

As shown in FIG. 3, a mobile terminal apparatus UE includes a radio link control section 202 and a MAC demultiplexing section 203 as a higher layer and includes a channel estimation section 201, a decoding section 204, a demodulation section 205, a resource demapping section 206, an OFDM receiving section 207, a reference signal prediction section 208, a despreading section 209, a reference signal pattern selection section 211 and a control information signal demodulation section 212 as a physical layer. The OFDM receiving section 207 performs OFDM reception processing on transmission data transmitted from the radio base station apparatus eNB.

The resource demapping section 206 demaps the control information signal including a reference signal configuration in predetermined resource elements for control channels and reports the demapped control information signal to the control information signal demodulation section 212. Furthermore, the resource demapping section 206 demaps reference signals based on the reference signal configuration reported via the reference signal pattern selection section 211 and reports the demapped reference signals to the despreading section 209. Furthermore, the resource demapping section 206 demaps the received data signal based on the resource allocation information reported via the control information signal demodulation section 212 and reports the demapped received data signal to the demodulation section 205.

The control information signal demodulation section 212 demodulates the control information signal reported from the resource demapping section 206 and extracts resource allocation information, demodulation information, decoding information and reference signal configuration of the received data signal. The reference signal pattern selection section 211 reports the reference signal configuration to the resource demapping section 206 based on the reference signal configuration reported via the control information signal demodulation section 212. The resource demapping section 206 demaps the reference signals based on the reference signal configuration.

When the reference signals are multiplexed according to a CDM scheme, the despreading section 209 despreads the reference signal sequence. The reference signal prediction section 208 predicts the reference signals in the time axis direction using subcarriers including past reference signals. Details of the reference signal prediction section 208 will be described later. The channel estimation section 201 performs channel estimation based on the reference signals and calculates channel quality information. The channel estimation section 201 feeds back the calculated channel quality information to the radio base station apparatus eNB over an uplink.

The demodulation section 205 demodulates the data signal based on the demodulation information reported from the control information signal demodulation section 212. The decoding section 204 decodes the demodulated data signal based on the decoding information reported from the control information signal demodulation section 212. The MAC demultiplexing section 203 MAC-demultiplexes the decoded data signal. The radio link control section 202 links MAC-demultiplexed data signals.

The radio base station apparatus and the mobile terminal apparatus configured as shown above need not be provided with all functions of functional blocks in embodiments which will be described later. The functional blocks may be used as appropriate in the respective embodiments.

A first embodiment will be described with reference to FIG. 4. FIG. 4 is a diagram illustrating the first embodiment. Since reference signals are not multiplexed according to a CDM scheme in the first embodiment, the spreading section of the radio base station apparatus and the despreading section of the mobile terminal apparatus are unnecessary. Furthermore, the first embodiment periodically sets priority levels among radio base station apparatuses. For this reason, the reference signal pattern selection section need not acquire any traffic type, amount of traffic or MIMO information from neighboring radio base station apparatuses via the scheduler section.

Figure 4A:
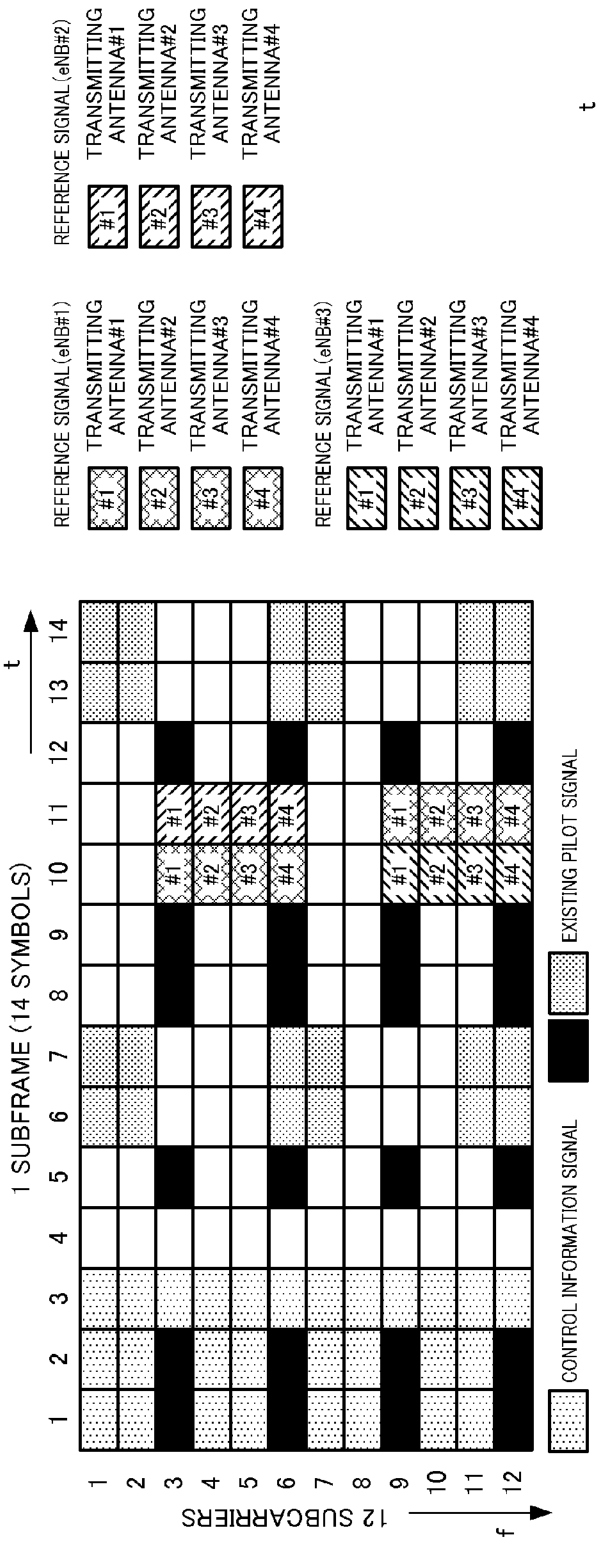
FIG. 4A is a diagram illustrating a first embodiment.

FIG. 4A shows a reference signal configuration (reference signal pattern) per resource block. FIG. 4A illustrates one resource block in which a frequency domain is made up of 12 subcarriers and one subframe is made up of 14 symbols. In this one resource block, transmission data, existing pilot signals (used by terminals up to REL9-LTE), control information signal and reference signals are multiplexed so as not to overlap with each other in the time domain and the frequency domain. Reference signals are provided for each transmitting antenna.

In the first embodiment, three radio base station apparatuses eNB#1 to #3 multiplex reference signals in FDM (Frequency Division Multiplexing) using four transmitting antennas. In the present first embodiment, the number of reference signals per transmitting antenna of a radio base station apparatus eNB with high priority is set to 2 and the number of reference signals per transmitting antenna of the other radio base station apparatuses eNB is set to 1 and a bias is introduced in the number of reference signals according to priority. That is, the number of reference signals of the radio base station apparatus eNB with high priority is 8 and the number of reference signals of each of the other radio base station apparatus eNB is 4, and a total of 16 reference signals are multiplexed with 16 resource elements.

For example, in FIG. 4A, reference signals of transmitting antennas #1 to #4 of the radio base station apparatus eNB#1 are arranged in four resource elements of the tenth and eleventh symbols respectively. Furthermore, reference signals of transmitting antennas #1 to #4 of the radio base station apparatus eNB#2 are arranged in four resource elements of the eleventh symbol. Reference signals of transmitting antenna #1 to #4 of the radio base station apparatus eNB#3 are arranged in four resource elements of the tenth symbol.

Thus, the first embodiment sets priority among neighboring radio base station apparatuses eNB, thereby introduces a bias in the number of reference signal allocated and arranges reference signals of all transmitting antennas of neighboring radio base station apparatuses eNB in different resource elements. Therefore, reference signals are orthogonalized to each other between neighboring radio base station apparatuses eNB and reference signals are orthogonalized to each other between transmitting antennas of each radio base station apparatus eNB. This configuration allows simultaneous channel estimation to be realized while maintaining predetermined estimation accuracy without interference between neighboring radio base station apparatuses eNB. Furthermore, it is possible to increase the number of radio base station apparatuses eNB for which simultaneous channel estimation is possible without increasing the number of resource elements for reference signal allocation.

Figure 4B:
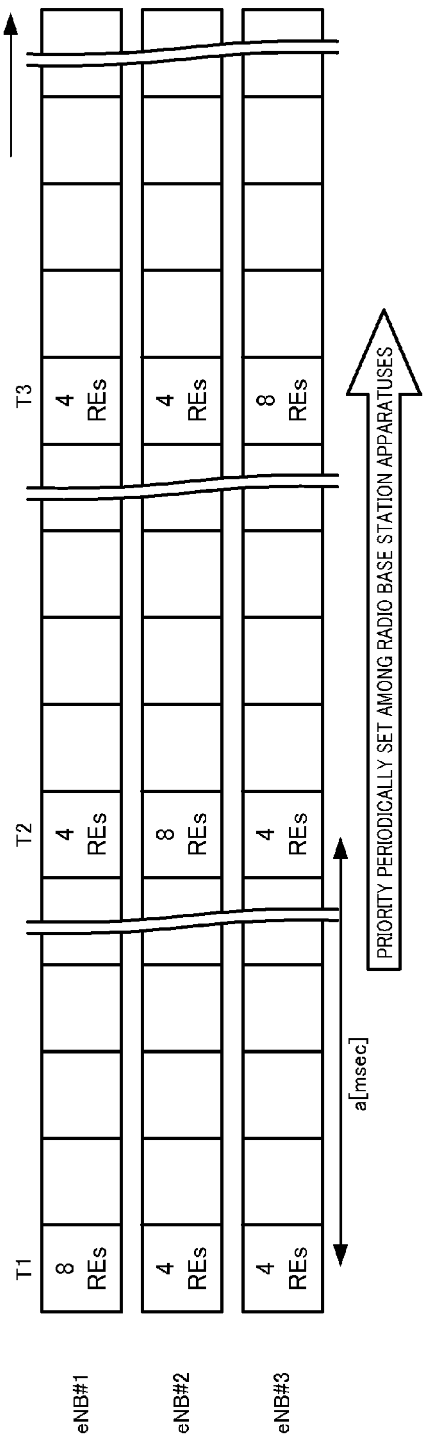
FIG. 4B is a diagram illustrating the first embodiment.

Furthermore, as shown in FIG. 4B, the first embodiment periodically changes priority levels among radio base station apparatuses eNB. For example, at time T1, the priority level of the radio base station apparatus eNB#1 is highest, the number of reference signals allocated of the radio base station apparatus eNB#1 is set to 8 and the number of reference signals allocated of the radio base station apparatuses eNB#2 and #3 is set to 4 for one resource block. At time T2 which is a[msec] (e.g., 10 [msec]) after time T1, priority of the radio base station apparatus eNB#2 is highest, the number of reference signals allocated of the radio base station apparatus eNB#2 is set to 8 and the number of reference signals allocated of the radio base station apparatuses eNB#1 and #3 are set to 4 for one resource block. At time T3 a[msec] after time T2, priority of the radio base station apparatus eNB#3 is highest, the number of reference signals allocated of the radio base station apparatus eNB#3 is set to 8 and the number of reference signals allocated of the radio base station apparatuses eNB#1 and #2 is set to 4 for one resource block.

By periodically changing priority levels among the radio base station apparatuses eNB in this way, it is possible to keep constant the quality of reference signals from each radio base station apparatus eNB received by the mobile terminal apparatus UE. Furthermore, it is not necessary to acquire the traffic type, amount of traffic, MIMO information or the like from other radio base station apparatuses eNB, which makes easier the selection processing on a reference signal configuration by the reference signal pattern selection section 111.

A second embodiment will be described with reference to FIG. 5. FIG. 5 is a diagram illustrating the second embodiment. The second embodiment is different from the first embodiment in that multiplexing in CDM is performed in addition to multiplexing in FDM. Therefore, only differences will be particularly described.

Figure 5A:
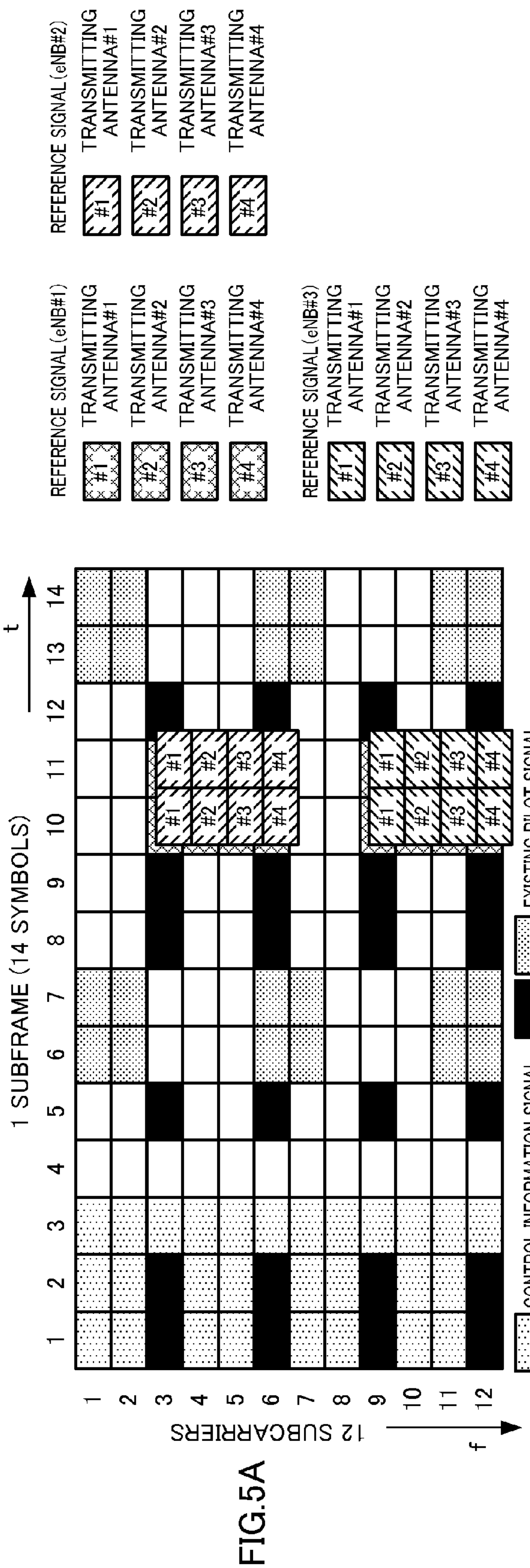
FIG. 5A is a diagram illustrating a second embodiment.

As shown in FIG. 5A, in the second embodiment, three radio base station apparatuses eNB#1 to #3 multiplex reference signals in FDM and CDM using four transmitting antennas. The present second embodiment sets the number of reference signals per transmitting antenna of a radio base station apparatus eNB with high priority to 4 and sets the number of reference signals per transmitting antenna of other radio base station apparatuses eNB to 2, and thereby introduces a bias in the number of reference signals according to priority. That is, the number of reference signals of the radio base station apparatus eNB with high priority is 16 and the number of reference signals of the other radiobase station apparatuses eNB is 8 respectively, and a total of 32 reference signals are multiplexed with 16 resource elements. In this case, two reference signals are multiplexed in CDM with one resource element.

For example, in FIG. 5A, reference signals of the transmitting antennas #1 to #4 of the radio base station apparatus eNB#1 are arranged in eight resource elements of the tenth and eleventh symbols. Reference signals of the transmitting antennas #1 to #4 of the radio base station apparatus eNB#2 are multiplexed in CDM with the four resource elements of the tenth and eleventh symbols in which the reference signals of the radio base station apparatus eNB#1 are arranged. Reference signals of the transmitting antennas #1 to #4 of the radio base station apparatus eNB#3 are multiplexed in CDM with the remaining four resource elements of the tenth and eleventh symbols where the reference signals of the radio base station apparatus eNB#1 are arranged but where no reference signals of the radio base station apparatus eNB#2 are multiplexed.

Figure 5B:
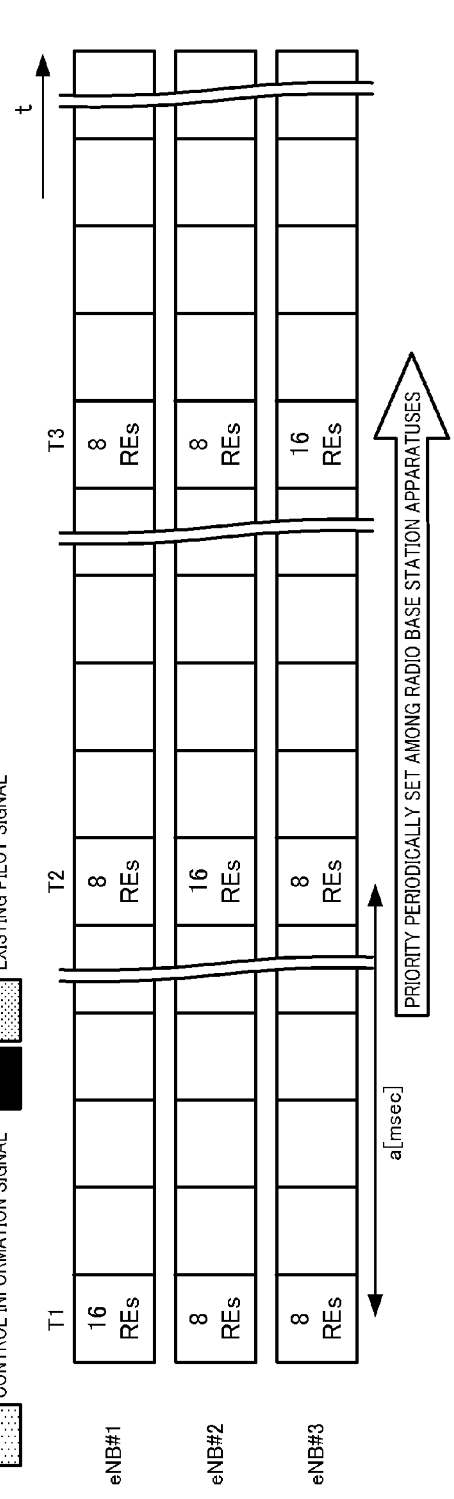
FIG. 5B is a diagram illustrating the second embodiment.

Thus, the second embodiment sets priority among radio base station apparatuses eNB, thereby introduces a bias in the number of reference signals allocated and orthogonalizes reference signals of all transmitting antennas of neighboring radio base station apparatuses eNB through multiplexing in CDM. This configuration makes it possible to prevent neighboring radio base station apparatuses eNB from interfering with each other, keep predetermined estimation accuracy and realize simultaneous channel estimation. This configuration can also increase the number of radio base station apparatuses eNB capable of simultaneous channel estimation without increasing the number of resource elements for reference signal allocation. Furthermore, increasing the number of reference signals per transmitting antenna can improve the channel estimation accuracy. Furthermore, as shown in FIG. 5B, priority levels are also periodically switched among the radio base station apparatuses eNB in the second embodiment in the same way as in the first embodiment.

A third embodiment will be described with reference to FIG. 6. FIG. 6 is a diagram illustrating the third embodiment. The third embodiment is different from the first embodiment in that the reference signal configuration of each radio base station apparatus supports eight transmitting antennas. Therefore, only differences will be particularly described.

In the third embodiment, three radio base station apparatuses eNB#1 to #3 multiplex reference signals in FDM using eight transmitting antennas. The third embodiment sets the number of reference signals per transmitting antenna of a radio base station apparatus eNB with high priority to 2 and sets the number of reference signals per transmitting antenna of other radio base station apparatuses eNB to 1 and introduces a bias in the number of reference signals according to priority. That is, the number of reference signals of the radio base station apparatus eNB with high priority is 16, the number of reference signals of the other radio base station apparatuses eNB is 8 and a total of 32 reference signals are multiplexed with 32 resource elements.

Figure 6A:
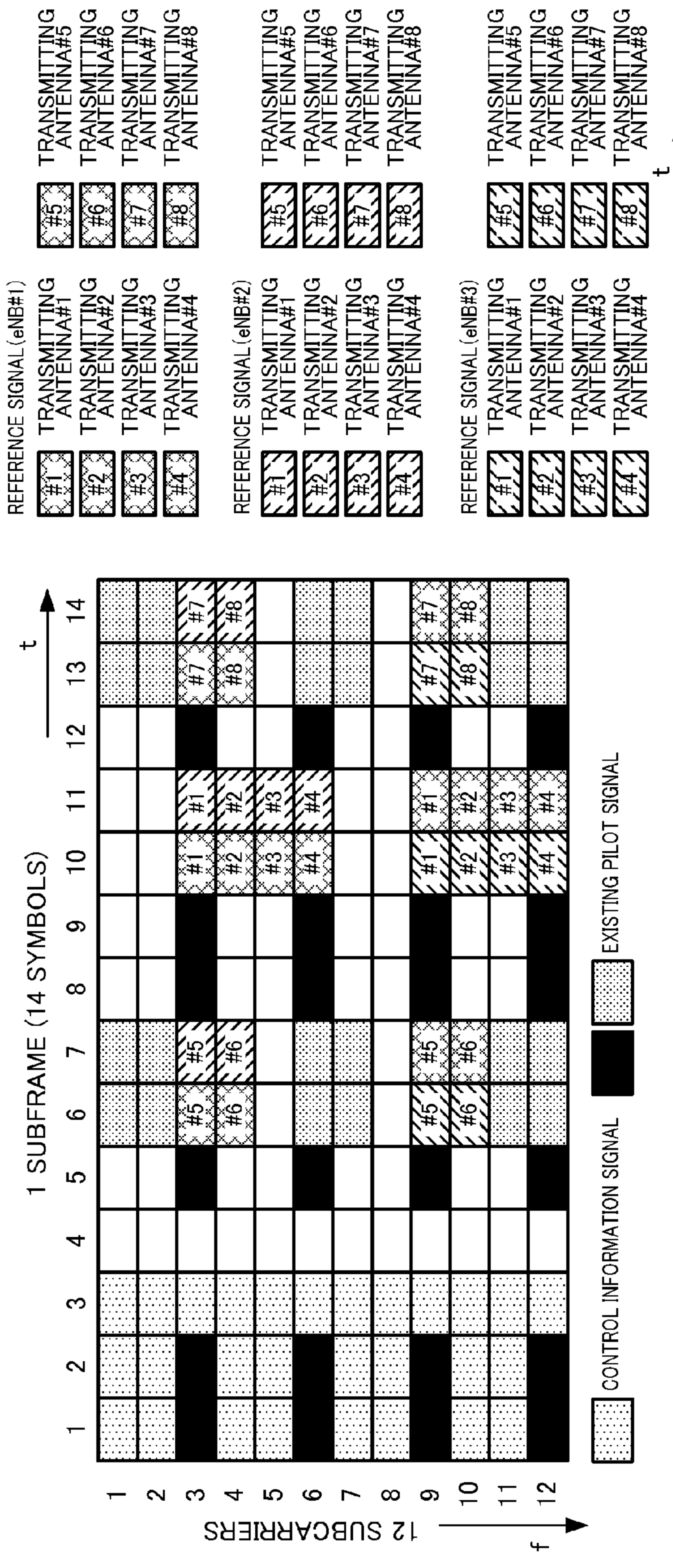
FIG. 6A is a diagram illustrating a third embodiment.

For example, in FIG. 6A, reference signals of transmitting antennas #1 to #4 of the radio base station apparatus eNB#1 are arranged in four resource elements of the tenth and eleventh symbols respectively. Reference signals of transmitting antennas #5 and #6 of the radio base station apparatus eNB#1 are arranged in two resource elements of the sixth and seventh symbols respectively. Reference signals of transmitting antennas #7 and #8 of the radio base station apparatus eNB#1 are arranged in two resource elements of the thirteenth and fourteenth symbols.

Reference signals of transmitting antennas #1 to #4 of the radio base station apparatus eNB#2 are arranged in four resource elements of the eleventh symbol. Reference signals of transmitting antennas #5 and #6 of the radio base station apparatus eNB#2 are arranged in two resource elements of the seventh symbol. Reference signals of transmitting antennas #7 and #8 of the radio base station apparatus eNB#2 are arranged in two resource elements of the fourteenth symbol. Reference signals of transmitting antennas #1 to #4 of the radio base station apparatus eNB#3 are arranged in four resource elements of the tenth symbol. Reference signals of transmitting antennas #5 and #6 of the radio base station apparatus eNB#3 are arranged in two resource elements of the sixth symbol. Reference signals of transmitting antennas #7 and #8 of the radio base station apparatus eNB#3 are arranged in two resource elements of the thirteenth symbol.

Figure 6B:
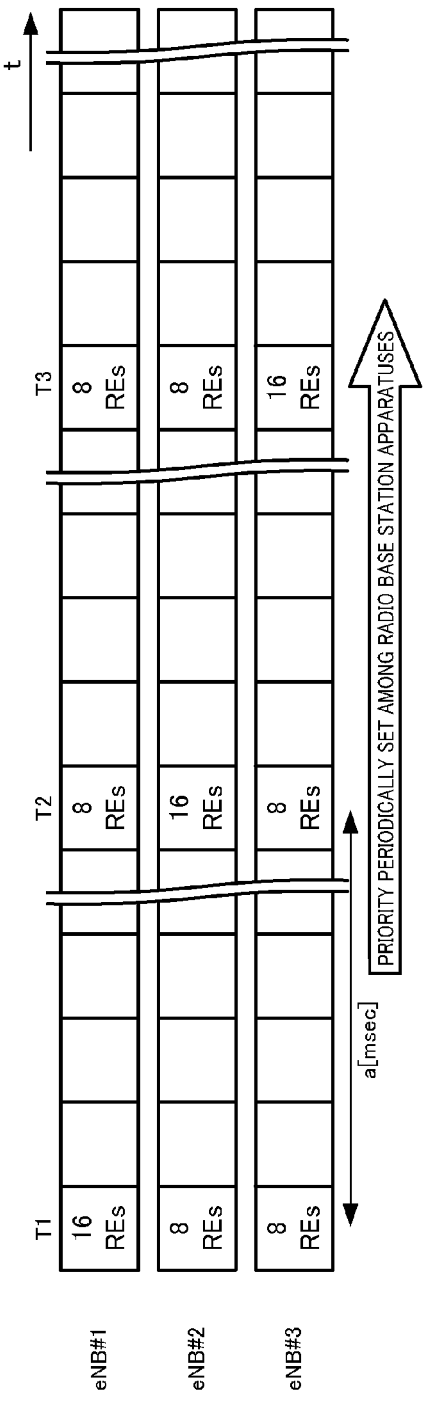
FIG. 6B is a diagram illustrating the third embodiment.

Thus, the third embodiment sets priority among the radio base station apparatuses eNB, thereby introduces a bias in the number of reference signals allocated, newly provides resource elements for reference signals and thereby orthogonalizes reference signals of all transmitting antennas of neighboring radio base station apparatuses eNB. With such a configuration, even when each radio base station apparatus eNB has eight transmitting antennas, it is possible to prevent the neighboring radio base station apparatuses eNB from interfering with each other and realize simultaneous channel estimation while maintaining predetermined estimation accuracy. Furthermore, as shown in FIG. 6B, the third embodiment also periodically changes priority levels among radio base station apparatuses eNB in the same way as the first embodiment.

A fourth embodiment will be described with reference to FIG. 7. FIG. 7 is a diagram illustrating the fourth embodiment. The fourth embodiment is different from the third embodiment in that multiplexing in CDM is performed in addition to multiplexing in FDM. Therefore, only differences will be particularly described.

Figure 7A:
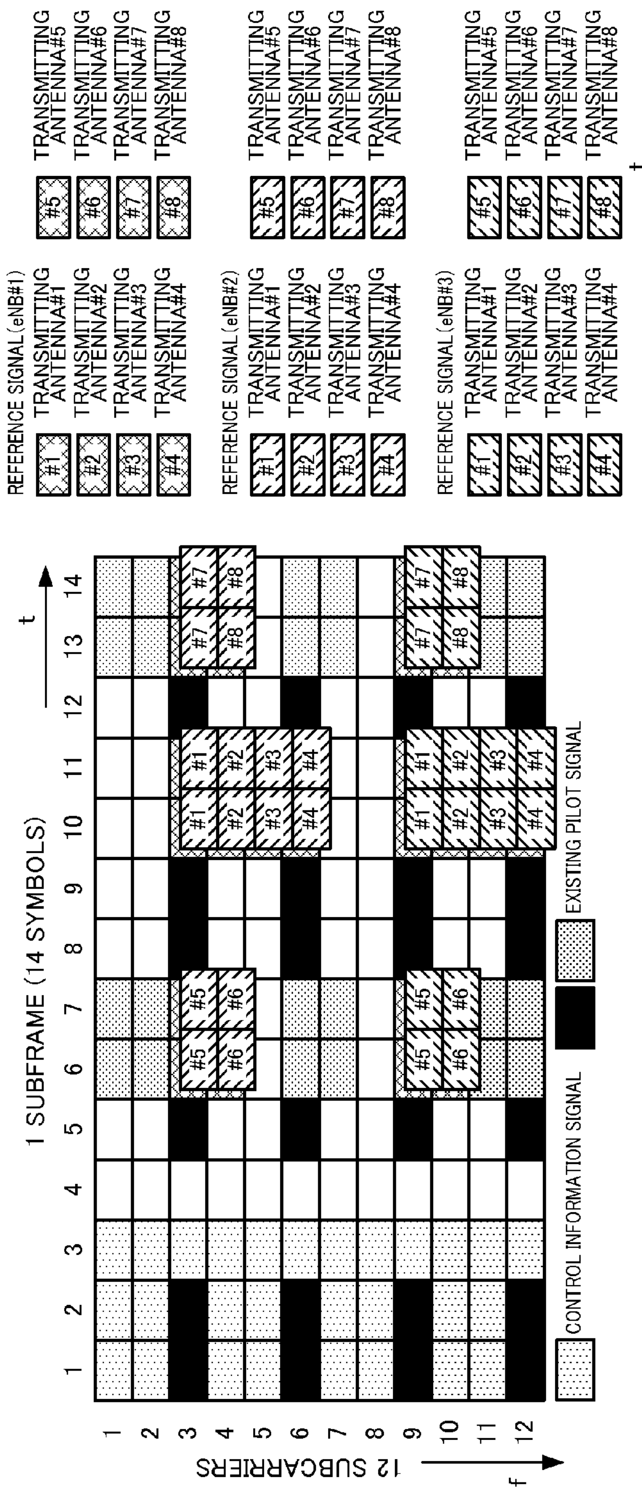
FIG. 7A is a diagram illustrating a fourth embodiment.

As shown in FIG. 7A, in the fourth embodiment, three radio base station apparatuses eNB#1 to #3 multiplex reference signals in FDM and CDM using eight transmitting antennas. The present fourth embodiment sets the number of reference signals per transmitting antenna of a radio base station apparatus eNB with high priority to 4 and sets the number of reference signals per transmitting antenna of other radio base station apparatuses eNB to 2, and thereby introduces a bias in the number of reference signals according to priority. That is, the number of reference signals of the radio base station apparatus eNB with high priority is 32 and the number of reference signals of the other radio base station apparatuses eNB is 16, and a total of 64 reference signals are multiplexed with 32 resource elements. In this case, two reference signals are multiplexed in CDM with one resource element.

For example, in FIG. 7A, reference signals of the transmitting antennas #1 to #4 of the radio base station apparatus eNB#1 are arranged in eight resource elements of the tenth and eleventh symbols respectively. Reference signals of the transmitting antennas #5 and #6 of the radio base station apparatus eNB#1 are arranged in four resource elements of the sixth and seventh symbols respectively. Reference signals of the transmitting antennas #7 and #8 of the radio base station apparatus eNB#1 are arranged in four resource elements of the thirteenth and fourteenth symbols respectively.

Reference signals of transmitting antennas #1 to #4 of the radio base station apparatus eNB#2 are multiplexed in CDM with four resource elements of the tenth and eleventh symbols respectively in which reference signals of the radio base station apparatus eNB#1 are arranged. Reference signals of transmitting antennas #5 and #6 of the radio base station apparatus eNB#2 are multiplexed in CDM with two resource elements of the sixth and seventh symbols respectively in which reference signals of the radio base station apparatus eNB#1 are arranged. Reference signals of transmitting antennas #7 and #8 of the radio base station apparatus eNB#2 are multiplexed in CDM with two resource elements of the thirteenth and fourteenth symbols respectively in which reference signals of the radio base station apparatus eNB#1 are arranged.

Reference signals of transmitting antennas #1 to #4 of the radio base station apparatus eNB#3 are multiplexed in CDM in the remaining four resource elements of the tenth and eleventh symbols respectively where reference signals of the radio base station apparatus eNB#1 are arranged but where no reference signals of the radio base station apparatus eNB#2 are multiplexed. Reference signals of transmitting antennas #5 and #6 of the radio base station apparatus eNB#3 are multiplexed in CDM with the remaining two resource elements of the sixth and seventh symbols where reference signals of the radio base station apparatus eNB#1 are arranged respectively but where no reference signals of the base station apparatus eNB#2 are multiplexed. Reference signals of transmitting antennas #7 and #8 of the radio base station apparatus eNB#3 are multiplexed in CDM with the remaining two resource elements of the thirteenth and fourteenth symbols where reference signals of the radio base station apparatus eNB#1 are arranged respectively but where no reference signals of the radio base station apparatus eNB#2 are multiplexed.

Figure 7B:
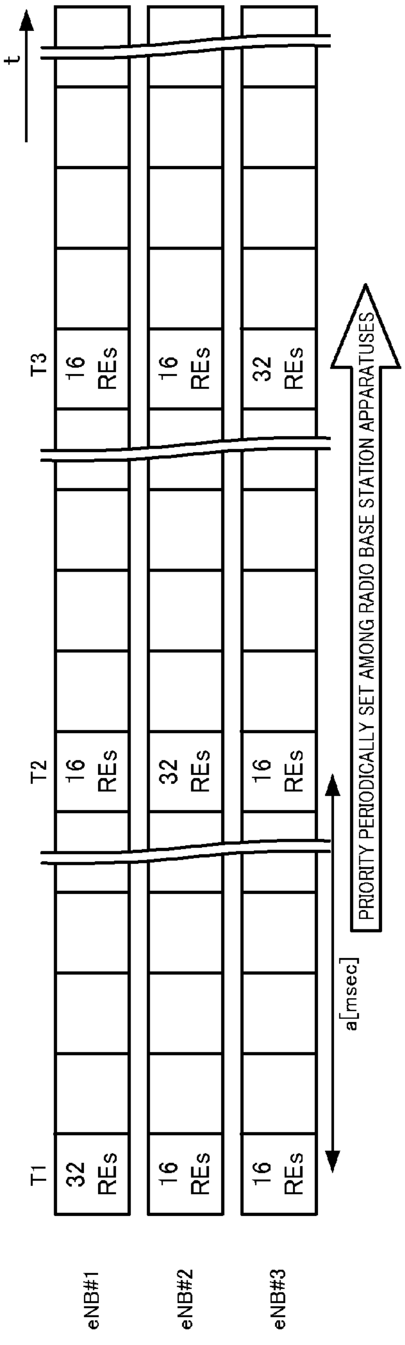
FIG. 7B is a diagram illustrating the fourth embodiment.

Thus, the fourth embodiment sets priority among radio base station apparatuses eNB, thereby introduces a bias in the number of reference signals allocated and orthogonalizes reference signals of all transmitting antennas of neighboring radio base station apparatuses eNB through multiplexing in CDM. With such a configuration, even when each radio base station apparatus eNB has eight transmitting antennas, it is possible to prevent the neighboring radio base station apparatuses eNB from interfering with each other and realize simultaneous channel estimation while maintaining predetermined estimation accuracy. Furthermore, increasing the number of reference signals per transmitting antenna can improve the channel estimation accuracy. Furthermore, as shown in FIG. 7B, the fourth embodiment also periodically changes priority levels among radio base station apparatuses eNB in the same way as in the first embodiment.

A fifth embodiment will be described with reference to FIG. 8. FIG. 8 is a diagram illustrating the fifth embodiment. The fifth embodiment is different from the first to fourth embodiments in that priority levels are set according to the traffic type between neighboring radio base station apparatuses. Therefore, only differences will be particularly described. Furthermore, the fifth embodiment sets priority levels according to the traffic type. For this reason, the reference pattern selection section need not acquire MIMO information or the like from the neighboring radio base station apparatuses via the scheduler section. Furthermore, a case will be described in FIG. 8 where each radio base station apparatus has four transmitting antennas, but four or more transmitting antennas may also be used.

Figure 8A:
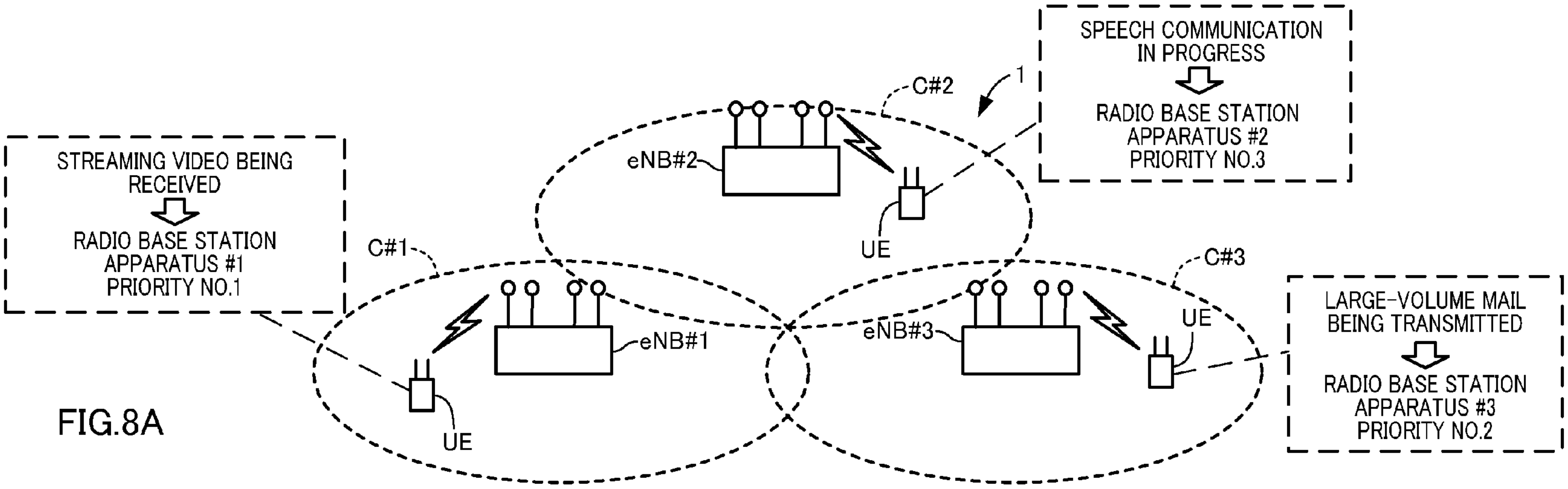
FIG. 8A is a diagram illustrating a fifth embodiment.

As shown in FIG. 8A, the radio base station apparatus eNB#1 is performing streaming video delivery processing, the radio base station apparatus eNB#2 is performing speech communication processing and the radio base station apparatus eNB#3 is performing large-volume mail transmission processing. Since a high quality communication channel is required for streaming video delivery processing, highest priority is set in the radio base station apparatus eNB#1. Since the communication capacity of speech communication processing is small, lowest priority is set in the radio base station apparatus eNB#2. Since a high quality communication channel is not always necessary for large-volume mail transmission processing, second highest priority is set in the radio base station apparatus eNB#3.

To be more specific, the reference signal pattern selection section 111 of the radio base station apparatus eNB acquires the traffic type of the own apparatus included in the scheduler information reported from the scheduler section 101. Furthermore, the reference signal pattern selection section 111 acquires the traffic type of the other radio base station apparatuses eNB included in the radio base station information of the other radio base station apparatuses eNB acquired via the scheduler section 101. The reference signal pattern selection section 111 then sets priority based on the traffic type of the own apparatus and the other neighboring radio base station apparatuses eNB.

Figure 8B:
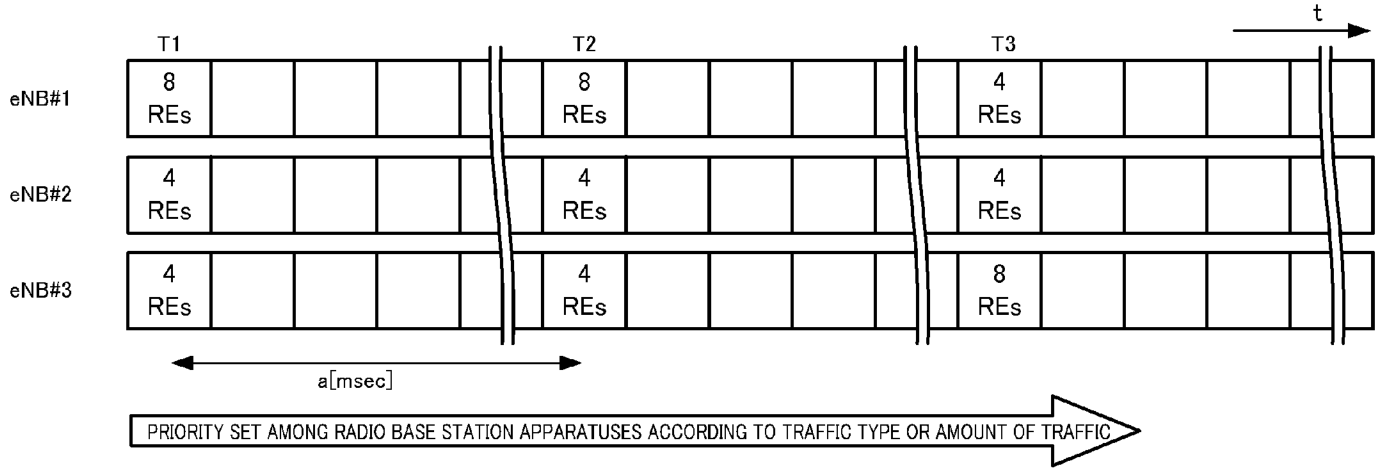
FIG. 8B is a diagram illustrating the fifth embodiment.

Furthermore, as shown in FIG. 8B, eight reference signals per resource block are arranged in a radio base station apparatus eNB with high priority and four reference signals per resource block are arranged in the remaining radio base station apparatuses eNB. For example, at time T1 and time T2, the radio base station apparatus eNB#1 has the highest priority, and for one resource block, the number of reference signals allocated is set to 8 for the radio base station apparatus eNB#1 and the number of reference signals allocated is set to 4 for the radio base station apparatuses eNB#2 and #3. At time T3 which is a[msec] after time T2, the mail volume increases instantaneously and the priority of the radio base station apparatus eNB#3 becomes highest. Therefore, at time T3, for one resource block, the number of reference signals allocated for the radio base station apparatus eNB#3 is set to 8 and the number of reference signals allocated for the radio base station apparatuses eNB#1 and #2 is set to 4. Thus, as in the case of large-volume mail transmission processing or the like, high priority may be set when some traffic types satisfy specific conditions.

Thus, by changing priority levels among radio base station apparatuses eNB according to the traffic type, it is possible to keep constant the quality of reference signals from each radio base station apparatus eNB received by the mobile terminal apparatus UE. Furthermore, compared to the configuration in which priority levels are periodically changed among radio base station apparatuses eNB, the channel estimation accuracy can be improved for traffic for which a high quality communication channel is required.

Furthermore, a configuration may also be adopted such that priority levels are changed among neighboring radio base station apparatuses eNB according to the amount of traffic instead of the traffic type. For example, when the number of mobile terminal apparatuses UE increases in the cell C covered by the radio base station apparatus eNB, the priority level of the radio base station apparatus eNB is increased. Furthermore, a configuration may also be adopted such that priority levels are changed among neighboring radio base station apparatuses eNB according to the traffic type and amount of traffic.

Furthermore, the fifth embodiment has described streaming video, large-volume mail and speech signals as examples of traffic type, but the present invention is not limited to this configuration. For example, a configuration may also be adopted such that priority is set according to the type or the like of streaming video.

A sixth embodiment will be described with reference to FIG. 9. FIG. 9 is a diagram illustrating the sixth embodiment. The sixth embodiment is different from the first to fourth embodiments in that priority levels are set through MIMO processing among neighboring radio base station apparatuses. Therefore, only differences will be particularly described. Furthermore, in the sixth embodiment, priority levels are set according to MIMO information. Thus, the reference pattern selection section need not acquire the traffic type and amount of traffic from neighboring radio base station apparatuses via the scheduler section. Furthermore, a case will be described in FIG. 9 where each radio base station apparatus has four transmitting antennas, but four or more transmitting antennas may also be used.

Figure 9A:
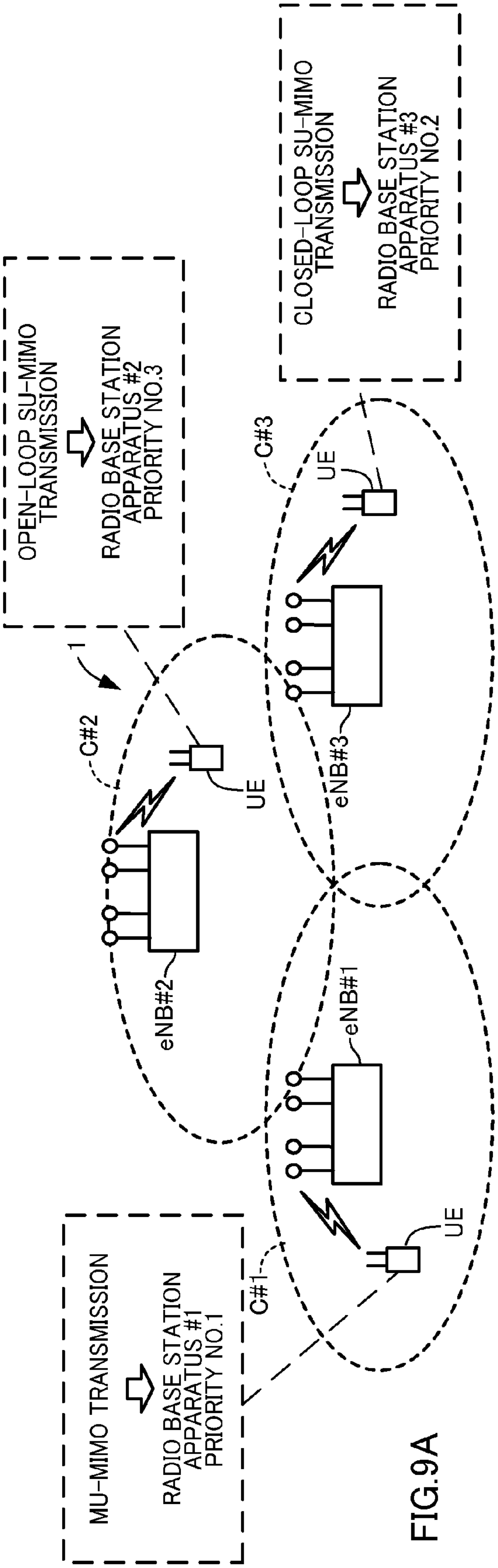
FIG. 9A is a diagram illustrating a sixth embodiment.

As shown in FIG. 9A, the radio base station apparatus eNB#1 is performing MU-MIMO processing, the radio base station apparatus eNB#2 is performing Open-Loop SU-MIMO processing and the radio base station apparatus eNB#3 is performing Closed-Loop SU-MIMO processing. In this case, high accuracy channel estimation is required in descending order of MU-MIMO processing, Closed-Loop SU-MIMO processing and Open-Loop SU-MIMO processing. Thus, highest priority is set in the radio base station apparatus eNB#1, second highest priority is set in the radio base station apparatus eNB#3 and lowest priority is set in the radio base station apparatus eNB#2.

To be more specific, the reference signal pattern selection section 111 of the radio base station apparatus eNB acquires MIMO information of the own apparatus included in scheduler information reported from the scheduler section 101. Furthermore, the reference signal pattern selection section 111 acquires MIMO information of the other radio base station apparatuses eNB included in radio base station information of the other radio base station apparatuses eNB acquired via the scheduler section 101. The reference signal pattern selection section 111 sets priority based on MIMO information of the own apparatus and other neighboring radio base station apparatuses eNB.

Figure 9B:
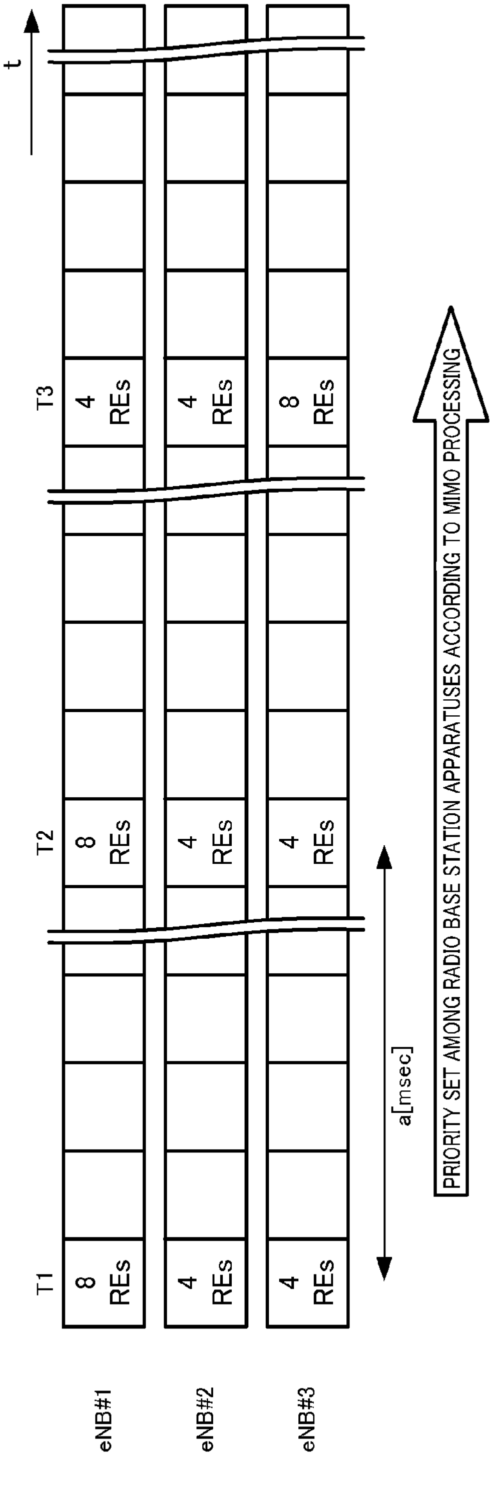
FIG. 9B is a diagram illustrating the sixth embodiment.

Furthermore, as shown in FIG. 9B, eight reference signals per resource block are arranged in a radio base station apparatus eNB with high priority and four reference signals per resource block are arranged in the remaining radio base station apparatuses eNB. For example, at time T1 and time T2, the priority of the radio base station apparatus eNB#1 is highest, and for one resource block, the number of reference signals allocated of the radio base station apparatus eNB#1 is set to 8 and the number of reference signals allocated of the radio base station apparatuses eNB#2 and #3 is set to 4. At time T3 which is a[msec] after time T2, MIMO processing of the radio base station apparatus eNB#3 is changed to processing more complicated than the MIMO processing of the radio base station apparatus #1, the priority of the radio base station apparatus eNB#3 becomes highest. Thus, at time T3, for one resource block, the number of reference signals allocated of the radio base station apparatus eNB#3 is set to 8 and the number of reference signals allocated of the radio base station apparatuses eNB#1 and #2 is set to 4.

By changing priority levels among radio base station apparatuses eNB according to MIMO processing, the quality of reference signals from each radio base station apparatus eNB received by the mobile terminal apparatus UE can be kept constant. Furthermore, compared to the configuration in which priority levels are periodically changed among radio base station apparatuses eNB, it is possible to improve channel estimation accuracy with respect to radio base station apparatuses eNB that perform complicated MIMO processing.

Furthermore, as described above, in MIMO processing, high priority is set in descending order of Intra-cell CoMP, MU-MIMO, Closed-Loop SU-MIMO and Open-Loop SU-MIMO. Furthermore, MIMO processing is not limited to these processes and any process may be performed as long as signals are transmitted/received using a plurality of antennas Next, reference signal prediction processing by the mobile terminal apparatus will be described with reference to FIG. 10. FIG. 10 is a diagram illustrating the reference signal prediction processing by the mobile terminal apparatus. When the reference signal prediction processing is not performed, the reference signal prediction section is unnecessary for the mobile terminal apparatus. Furthermore, a case will be described in FIG. 10 where each radio base station apparatus has four transmitting antennas, but four or more transmitting antennas may be used.

Figure 10A:
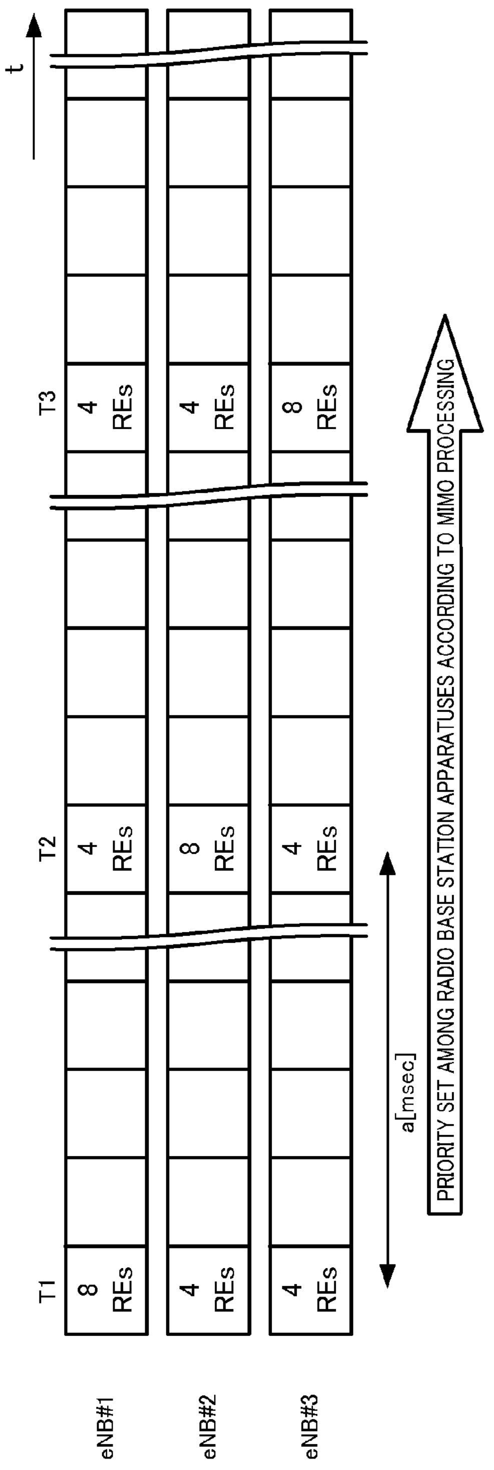
FIG. 10 is a diagram illustrating reference signal prediction processing by the mobile terminal apparatus.
Figure 10B:
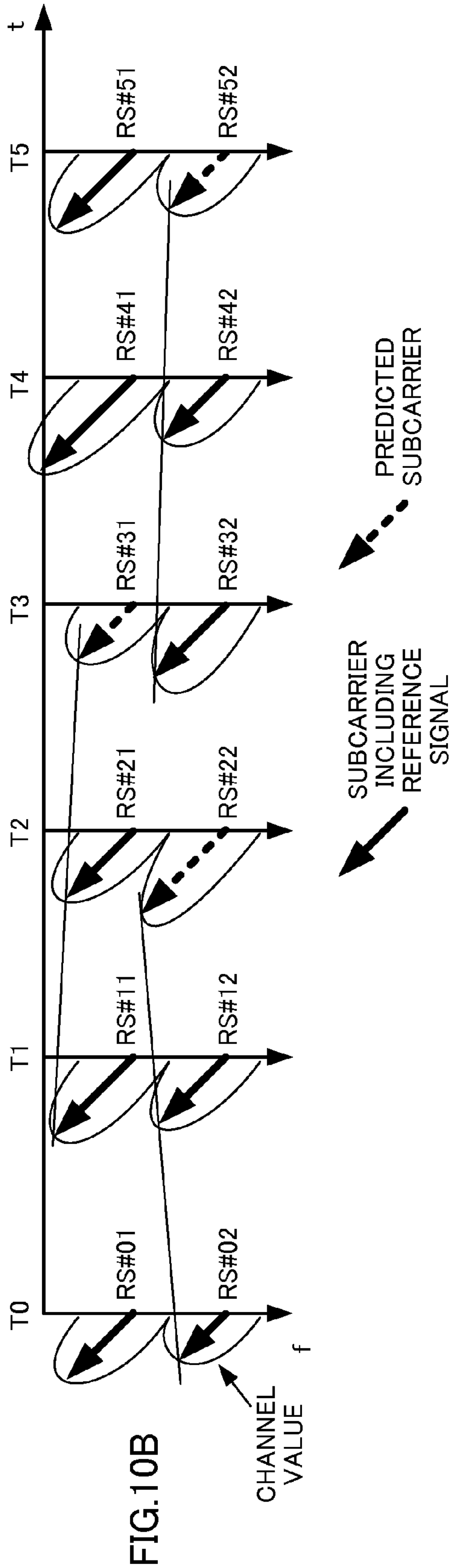

As shown in FIGS. 10A and 10B, eight reference signals per resource block are arranged in a radio base station apparatus eNB with high priority, while four reference signals per resource block are arranged in the remaining radio base station apparatuses eNB. For example, at time T1, the priority of the radio base station apparatus eNB#1 is set to be highest, at time T2, the priority of the radio base station apparatus eNB#2 is set to be highest and at time T3, the priority of the radio base station apparatus eNB#3 is set to be highest. That is, the mobile terminal apparatus UE receives two reference signals from one transmitting antenna of the radio base station apparatus eNB#1 at time T1 and receives one reference signal from one transmitting antenna of the radio base station apparatus eNB#1 at time T2 and time T3.

In this case, the reference signal prediction section 208 predicts lacking reference signals at time T2 and time T3 from reference signals received in the past to improve channel estimation accuracy at time T2 and time T3. Here, suppose a first reference signal from the transmitting antenna #1 at time Tn is #n1 and a second reference signal is #n2. The reference signal prediction section 208 performs linear prediction on a reference signal RS#22 from the magnitude of subcarriers including past reference signals RS#02 and #12 at time T2. Furthermore, the reference signal prediction section 208 performs linear prediction on a reference signal RS#31 from the magnitude of subcarriers including past reference signals RS#11 and #21 at time T3. Thus, linear prediction of reference signals by the reference signal prediction section 208 improves the channel estimation accuracy on the radio base station apparatuses eNB with low priority.

Figure 11:
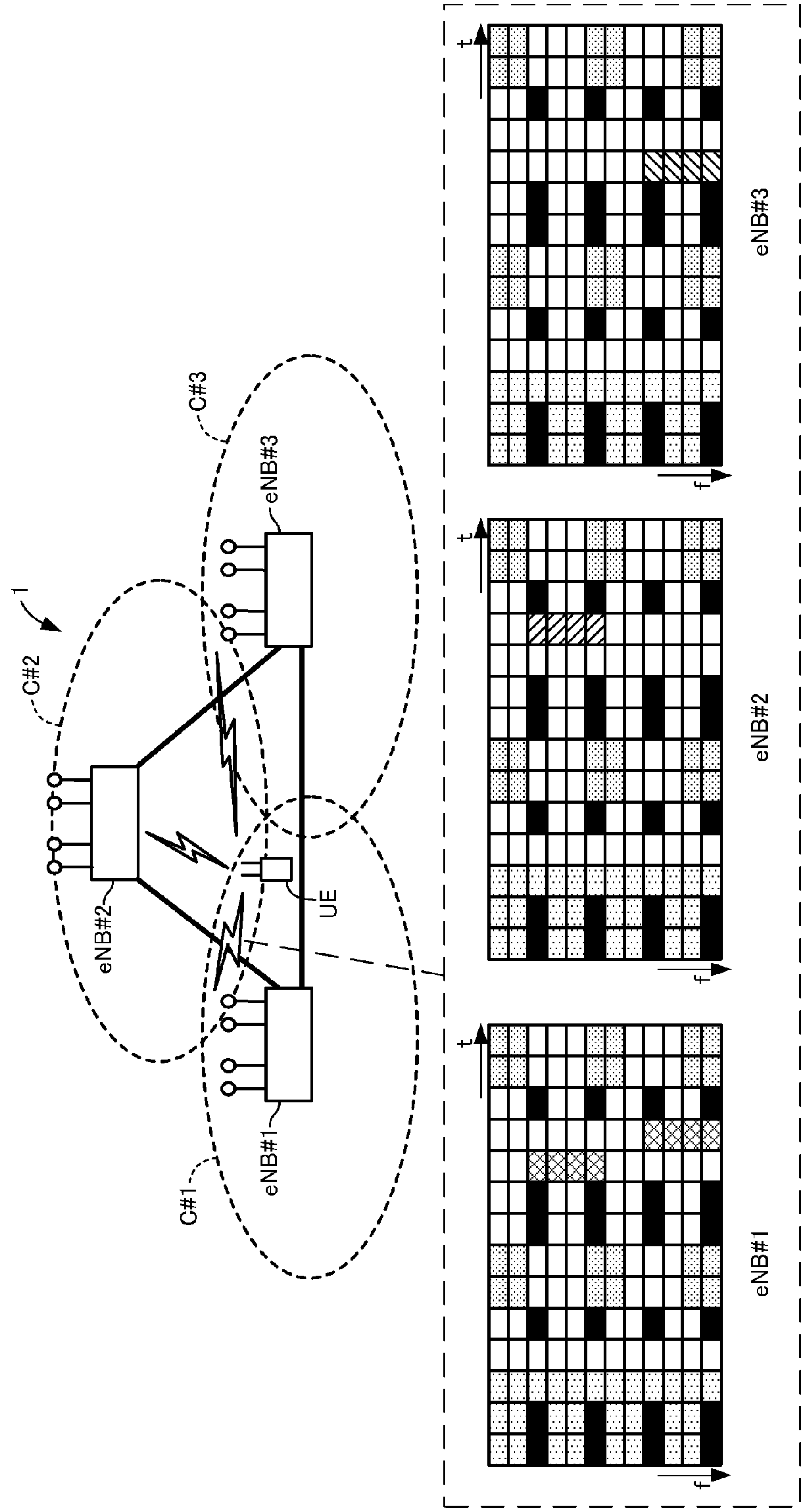
FIG. 11 is a diagram illustrating reference signal configuration reporting processing by the radio base station apparatus.

Next, reporting processing on a reference signal configuration by the radio base station apparatus will be described with reference to FIG. 11. FIG. 11 is a diagram illustrating reporting processing on the reference signal configuration by the radio base station apparatus. When the reporting processing on the reference signal configuration is not performed, the control information signal generation section of the radio base station apparatus need not add the reference signal configuration to the control information signal.

As shown in FIG. 11, neighboring radio base station apparatuses eNB#1 to #3 are synchronized with each other and share a reference signal configuration. Each radio base station apparatus eNB#1 to #3 then reports the number of reference signals and an allocation pattern of the own apparatus to the mobile terminal apparatus UE through signaling as the reference signal configuration. This configuration allows the mobile terminal apparatus UE to recognize the radio base station apparatus eNB and transmitting antenna of the sender of reference signals. The reference signal configuration may also be reported using control channels such as PDCCH (Physical Downlink Control Chanel) and PBCH (Physical Broadcast Channel). Furthermore, the reference signal configuration may also be configured so as to be embedded in a DCI format and reported.

Figure 12:
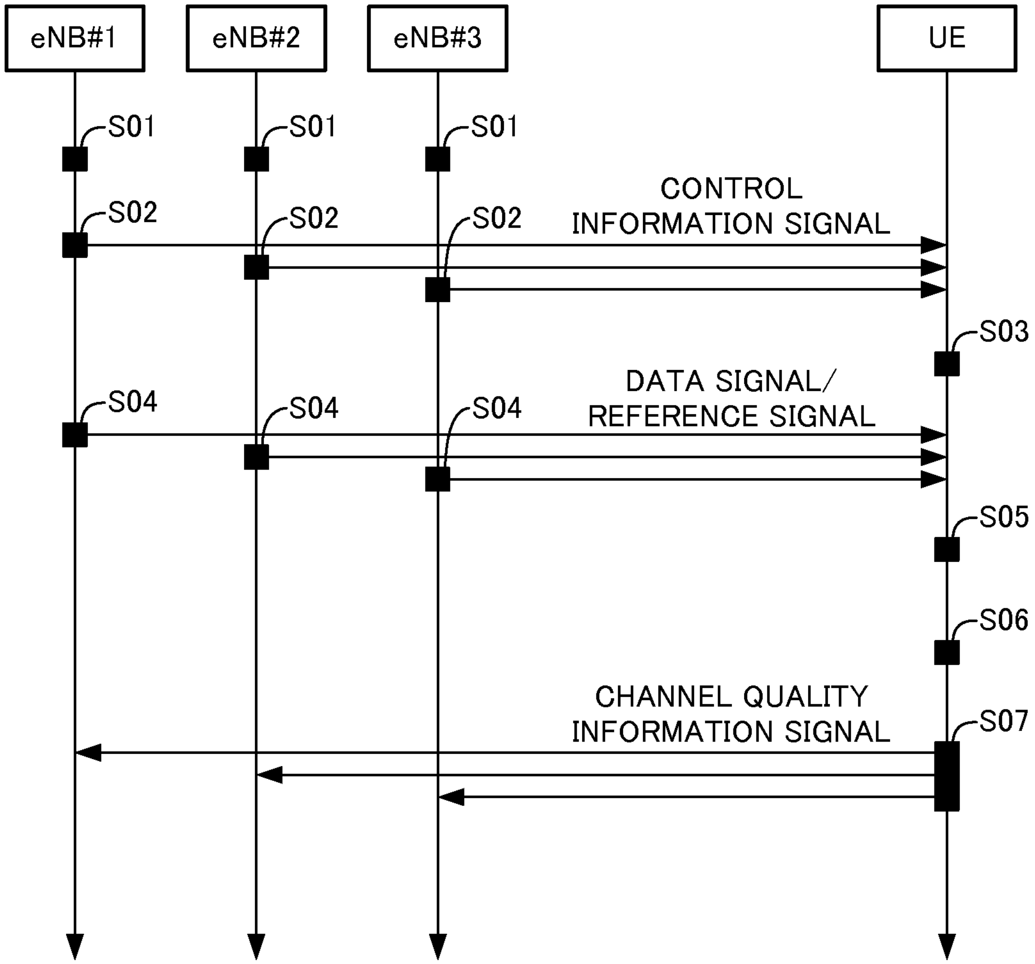
FIG. 12 is a sequence diagram of communication processing by the radio communication system.

Next, a flow of communication processing in a radio communication system will be described with reference to FIG. 12. FIG. 12 is a sequence diagram of communication processing in the radio communication system. In FIG. 12, for convenience of explanation, suppose the radio base station apparatus reports a reference signal configuration to the mobile terminal apparatus.

As shown in FIG. 12, the reference signal pattern selection section 111 of each radio base station apparatus eNB#1 to #3 selects a reference signal configuration according to priority (step S01). In this case, the radio base station apparatuses eNB#1 to #3 are synchronized with each other and the radio base station apparatuses eNB#1 to #3 share the reference signal configuration. Next, each radio base station apparatus eNB#1 to #3 reports a control information signal including reference signal configuration, resource allocation information or the like to the mobile terminal apparatus UE through signaling (step S02).

Next, the control information signal demodulation section 212 of the mobile terminal apparatus UE extracts the reference signal configuration, resource allocation information or the like from the control information signal (step S03). Next, each radio base station apparatus eNB#1 to #3 transmits an OFDM signal including reference signals and a data signal to the mobile terminal apparatus UE (step S04). Next, the resource demapping section 206 of the mobile terminal apparatus UE demaps the reference signals and data signal from the OFDM signal based on the reference signal configuration and resource allocation information reported from the control information signal demodulation section 212 (step S05). The data signal is sent to the radio link control section 102 via the demodulation section 205, decoding section 204 and MAC demultiplexing section 203 and linked by the radio link control section 202.

Next, the channel estimation section 201 of the mobile terminal apparatus UE performs channel estimation based on the reference signals reported from the resource demapping section 206 and calculates the channel quality information (step S06). Next, the mobile terminal apparatus UE feeds back the channel quality information calculated by the channel estimation section 201 to the radio base station apparatuses eNB#1 to #3 over an uplink (step S07).

As described so far, according to the radio communication system 1 according to the present embodiment, priority is set among neighboring radio base station apparatuses eNB and radio resources for reference signals shared among the radio base station apparatuses eNB are distributed to the respective radio base station apparatuses eNB according to the priority. Thus, it is possible to cause the total number of reference signals allocated among neighboring radio base station apparatuses eNB to fall within the limit of the number of radio resources shared among the radio base station apparatuses eNB and orthogonalize the reference signals among the neighboring radio base station apparatuses eNB. Therefore, the mobile terminal apparatus UE can perform simultaneous channel estimation among neighboring radio base station apparatuses eNB while suppressing interference. Furthermore, by introducing a bias in the number of radio resources allocated within the limit of radio resources shared among the neighboring radio base station apparatuses eNB, it is possible to increase the number of radio base station apparatuses eNB for which simultaneous channel estimation is possible while suppressing an increase in the number of reference signals allocated.

A case with a plurality of radio base station apparatuses whose coverage areas are contacting each other has been described in the above described embodiments as the neighboring radio base station apparatuses, but the present invention is not limited to this configuration. The neighboring radio base station apparatuses may be a plurality of any radio base station apparatuses as long as they fall within the range in which the mobile terminal apparatus can perform channel estimation.

A configuration has been described in the above described embodiments where each radio base station apparatus reports a reference signal configuration of its own apparatus to the mobile terminal apparatus, but the present invention is not limited to this configuration. A configuration may also be adopted such that any one of a plurality of radio base station apparatuses reports a reference signal configuration of the own apparatus and other radio base station apparatuses to the mobile terminal apparatus.

A configuration has been described in the above described embodiments where the reference signal prediction section performs linear prediction on lacking reference signals from two past received reference signals, but the present invention is not limited to this configuration. The reference signal prediction section needs only to predict lacking reference signals from a plurality of past reference signals and may perform prediction using, for example, three or more reference signals. Furthermore, although the reference signal prediction section is assumed to have a configuration so as to predict lacking reference signals through linear prediction, any method may be adopted as long as lacking reference signals can be predicted and, for example, lacking reference signals may be predicted statistically.

Furthermore, a configuration has been described in the above described embodiments where the reference signal pattern selection section of the radio base station apparatus sets priority and determines the number of reference signals allocated (selects a reference signal configuration), but the present invention is not limited to this configuration. A configuration may also be adopted such that the scheduler section of the radio base station apparatus sets priority and determines the number of reference signals allocated.

Furthermore, a configuration has been described in the above described embodiments where radio base station apparatuses having second and third priorities have the same number of reference signals allocated, but the present invention is not limited to this configuration. A configuration may also be adopted such that radio base station apparatuses with second and third priorities have different number of reference signals allocated or a radio base station apparatus having the highest priority and a radio base station apparatus having the second highest priority have the same number of reference signals allocated.

Furthermore, a configuration has been described in the above described embodiments where three radio base station apparatuses are neighboring each other, but the present invention is not limited to this configuration. The radio communication system may only have a configuration in which a plurality of radio base station apparatuses are neighboring each other.

The embodiments disclosed this time have been presented for illustrative purposes in every respect, and the present invention is not limited to these embodiments. The scope of the present invention is manifested not only in the above described embodiments but in the scope of claims, and is intended to include all changes within the meaning and the scope equivalent to the scope of claims.

What is claimed is:

1. A radio communication system comprising:

a plurality of radio base station apparatuses that have a plurality of transmitting antennas and transmit reference signals which are orthogonal to each other among the plurality of transmitting antennas; and a mobile terminal apparatus that performs simultaneous channel estimation based on the reference signals transmitted from the plurality of radio base station apparatuses, while maintaining predetermined estimation accuracy while increasing a number of radio base station apparatuses on which the mobile terminal apparatus performs the simultaneous channel estimation, while suppressing an increase in number of resource elements allocated for reference signals, the plurality of radio base station apparatuses comprising:

a reference signal generation section that generates the reference signals;

a priority setting section that sets priority with respect to other neighboring radio base station apparatus;

an allocation number determining section that determines the number of resource elements of the reference signals allocated according to the priority, in a resource block that is a unit of allocation to a user and is used in common with the other radio base station apparatus; and an allocation section that allocates the reference signals corresponding in number to the resource elements so as to be orthogonal to those of the other radio base station apparatus, and orthogonalizing reference signals from the plurality of base stations to each other within a resource block.

2. The radio communication system according to claim 1, wherein the priority setting section periodically changes and sets the priority among the plurality of radio base station apparatuses.

3. The radio communication system according to claim 1, wherein the priority setting section sets the priority among the plurality of radio base station apparatuses according to a traffic type or amount of traffic.

4. The radio communication system according to claim 1, wherein the plurality of radio base station apparatuses comprise a pre-coding section that performs pre- coding processing using the plurality of transmitting antennas, and the priority setting section sets the priority among the plurality of radio base station apparatuses according to the type of the pre-coding processing.

5. The radio communication system according to claim 1, wherein the mobile terminal apparatus comprises a reference signal prediction section that predicts reference signal using past reference signal.

6. The radio communication system according to claim 1, wherein the plurality of radio base station apparatuses transmit a reference signal configuration including the number of resource elements of the reference signals determined by the allocation number determining section to the mobile terminal apparatus.

7. The radio communication system according to claim 1, wherein the allocation section allocates the reference signals to different resource elements.

8. The radio communication system according to claim 7, wherein the allocation section can allocate a plurality of reference signals to the same resource elements using spreading codes.

9. A radio base station apparatus comprising:

a plurality of transmitting antennas;

a reference signal generation section that generates reference signals which are orthogonal to each other among the plurality of transmitting antennas;

a priority setting section that sets priority with respect to other neighboring radio base station apparatus;

an allocation number determining section that determines the number of resource elements of the reference signals allocated according to the priority, in a resource block that is a unit of allocation to a user and is shared with the other radio base station apparatus;

an allocation section that allocates the reference signals corresponding in number to the resource elements so as to be orthogonal to those of the other radio base station apparatus, and orthogonalizing reference signals from a plurality of base stations to each other within a resource block; and a transmitting section that transmits the reference signals to the mobile terminal apparatus using the plurality of transmitting antennas, wherein the mobile terminal apparatus is caused to perform simultaneous channel estimation based on the reference signals transmitted from the plurality of radio base station apparatuses, while maintaining predetermined estimation accuracy while increasing a number of radio base station apparatuses on which the mobile terminal apparatus performs the simultaneous channel estimation, while suppressing an increase in number of resource elements allocated for the reference signals.

10. A communication control method for a radio communication system comprising a plurality of radio base station apparatuses that have a plurality of transmitting antennas and transmit reference signals which are orthogonal to each other among the plurality of transmitting antennas and a mobile terminal apparatus that performs simultaneous channel estimation based on the reference signals transmitted from the plurality of radio base station apparatuses, the method comprising:

the plurality of radio base station apparatuses executing:

a step of generating the reference signals;

a step of setting priority with respect to other neighboring radio base station apparatus;

a step of determining the number of resource elements of the reference signals allocated according to the priority, in a resource block that is a unit of allocation to a user and is used in common with the other radio base station apparatus; and a step of allocating the reference signals corresponding in number to the resource elements so as to be orthogonal to those of the other radio base station apparatus, and orthogonalizing reference signals from the plurality of base stations to each other within a resource block, wherein the simultaneous channel estimation based on the reference signals transmitted from the plurality of radio base station apparatuses is performed while maintaining predetermined estimation accuracy while increasing a number of radio base station apparatuses on which the mobile terminal apparatus performs the simultaneous channel estimation, while suppressing an increase in number of resource elements allocated for reference signals.

* * * * *